United States Patent
LeQuere

(10) Patent No.: US 8,491,012 B2
(45) Date of Patent: Jul. 23, 2013

(54) QUICK-CONNECT FLUID COUPLING

(75) Inventor: Philippe LeQuere, Belton (FR)

(73) Assignee: Parker Hannifin Manufacturing France, Rennes (FR)

( * ) Notice: Subject to any disclaimer, the term of this patent is extended or adjusted under 35 U.S.C. 154(b) by 0 days.

(21) Appl. No.: 13/299,005

(22) Filed: Nov. 17, 2011

(65) Prior Publication Data

US 2012/0126526 A1    May 24, 2012

Related U.S. Application Data

(63) Continuation of application No. PCT/EP2010/056744, filed on May 17, 2010.

(30) Foreign Application Priority Data

May 18, 2009   (FR) ...................................... 09 02391

(51) Int. Cl.
   *F16L 17/00*   (2006.01)
(52) U.S. Cl.
   USPC ............................................ 285/95; 285/340
(58) Field of Classification Search
   USPC ...................... 285/340, 39, 108, 95
   See application file for complete search history.

(56) References Cited

U.S. PATENT DOCUMENTS

| | | | | |
|---|---|---|---|---|
| 3,312,483 A | * | 4/1967 | Leadbetter et al. | 285/340 |
| 3,429,596 A | * | 2/1969 | Marshall | 285/340 |
| 3,924,877 A | * | 12/1975 | Leopold et al. | 285/340 |
| 4,146,254 A | | 3/1979 | Turner et al. | |
| 4,288,113 A | * | 9/1981 | Saulnier | 285/238 |
| 4,919,457 A | * | 4/1990 | Moretti | 285/39 |
| 5,292,157 A | * | 3/1994 | Rubichon | 285/39 |
| 5,580,100 A | * | 12/1996 | Umezawa et al. | 285/39 |
| 6,264,250 B1 | * | 7/2001 | Teraoka et al. | 285/340 |

FOREIGN PATENT DOCUMENTS

| | | | |
|---|---|---|---|
| DE | 4304241 A1 | * | 8/1994 |
| EP | 610538 A1 | * | 8/1994 |
| EP | 0 616 161 B1 | | 9/1998 |
| FR | 2 385 024 A2 | | 10/1978 |
| FR | 2591309 A1 | * | 6/1987 |
| GB | 2245945 A | * | 1/1992 |
| GB | 2 401 920 A | | 11/2004 |

OTHER PUBLICATIONS

Written Opinion in corresponding international Application No. PCT/EP2010/056744.

* cited by examiner

*Primary Examiner* — Aaron Dunwoody
(74) *Attorney, Agent, or Firm* — John A. Molnar, Jr.

(57) ABSTRACT

A tube coupling including a body having a bore and an open end, a slidably movable jaw ring received in the bore, a bushing fitted into the body open end having a surface facing the movable jaw and defining a stationary jaw, and a resiliently expandable grab ring disposed in the bore between the movable and stationary jaw. With a tube end being inserted into the bore and through the grab ring, and with the tube being grabbed by the grab ring to retain the tube end in the bore, the movable jaw is responsive to fluid pressure received within the tube to slidably move towards the stationary jaw face such that a portion of the grab ring is clamped therebetween.

16 Claims, 2 Drawing Sheets

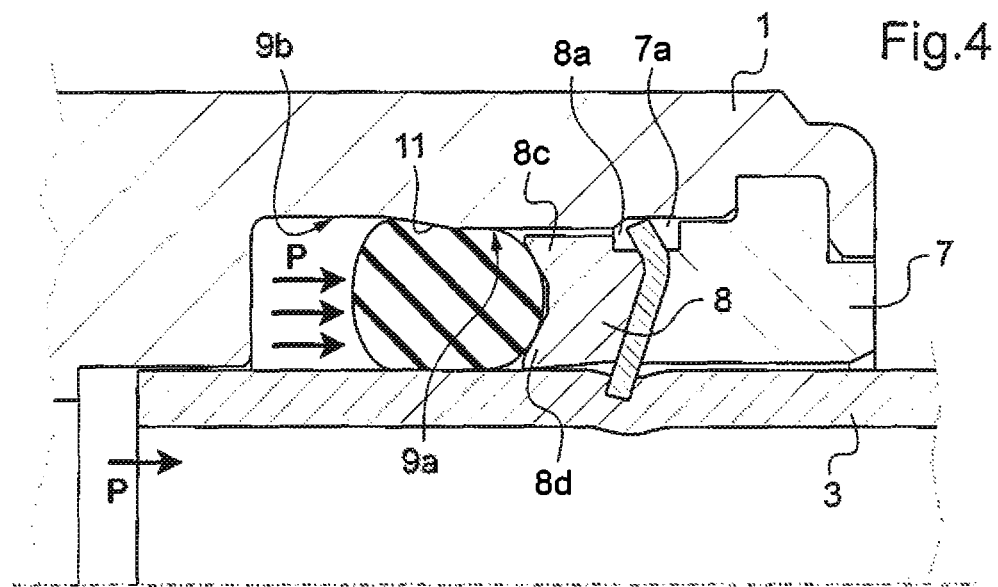
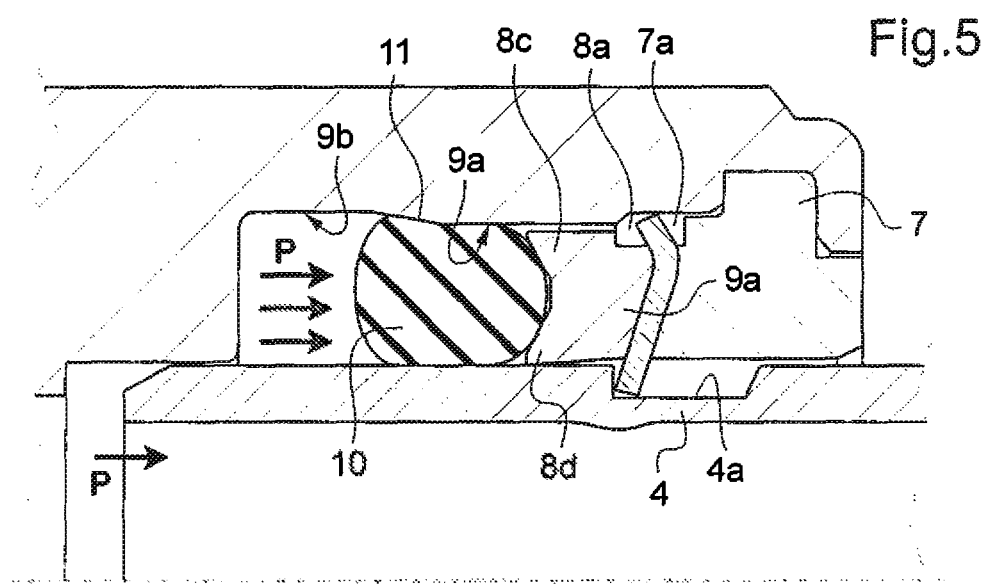

QUICK-CONNECT FLUID COUPLING

CROSS-REFERENCE TO RELATED APPLICATIONS

This application is continuation of co-pending International Application No. PCT/EP2010/056744, filed May 17, 2010, which designated the United States, and which claims priority to French Patent Application No. 09 02391, filed May 18, 2009, the disclosure of each of which is expressly incorporated herein by reference.

BACKGROUND OF THE INVENTION

The present invention relates to a quick-coupling device for fluid circuits that may be subjected to large pressure variations.

Most couplings with toothed washers have teeth that are flexible or resiliently movable and that are attached via their roots to a rigid ring that is housed in a groove of the bore. The groove is generally provided between a shoulder of the bore and an insert, thereby enabling the ring to be embedded and possibly even deformed to modify the angle of inclination of the teeth if the ring does not occupy a radial plane at rest. In other configurations the groove is made entirely in an insert that is pre-fitted with the washer. In order to ensure that the force opposing insertion of the tube is not too great, it is necessary for the teeth to have a degree of flexibility so that they splay apart easily when the end of the tube is passed in through them. This flexibility is obtained by cutouts and recesses in the teeth, but that is to the detriment of their ability to bite into the outer surface of the tube.

In an improvement to that type of coupling, proposals have already been made for a washer that is substantially frustoconical with its inside circumference being of a diameter that is less than the diameter of the tube, and being subdivided into a plurality of teeth, the outer portion of the washer being arranged in a groove formed in the bore, each tooth of the washer being constituted by a rigid blade possessing a short root portion that, at rest, extends in a radial plane, and an active portion that is inclined relative to the radial portion, the washer also including, between successive teeth, an elastically-deformable peripheral connection portion so that deforming the washer as a whole causes its teeth to move without deforming. That solution provides a clear improvement in control over the connection, but its ability to withstand the disconnection force due to the circuit being pressurized remains limited, and insufficient, in particular for circuits in which the fluid is a liquid and in which pressure hammering might occur.

The invention seeks to provide a quick coupling of the type summarized above that includes means for greatly increasing its ability to withstand disconnection. Document U.S. Pat. No. 4,146,254 constitutes the state of the art closest to the invention in that it describes means for radially stiffening retaining teeth so that they bite better into the tube that is to be retained. Nevertheless, that stiffening is not optimum for washers having teeth that are as flexible or as movable as possible in order to avoid impeding insertion of the tubular element. The invention thus proposes an improvement to that state of the art that remedies the above-mentioned drawbacks.

SUMMARY OF THE INVENTION

The invention thus provides a device for coupling a tubular element, the device comprising a body provided with a bore for receiving the end of the tubular element and retaining means for retaining the tubular element in the bore, the retaining means comprising at least one washer that is elastically deformable and substantially frustoconical, with the inside circumference thereof being of diameter less than the diameter of the tubular element, and being subdivided into a plurality of teeth, the outer portion of the washer being arranged in said bore between a shoulder thereof and a retaining bushing fitted to the body at the inlet of the bore, the retaining bushing constituting a stationary jaw against which one face of the washer bears, while the device includes a movable jaw housed in a setback of the bore situated beyond the shoulder relative to the stationary jaw and controlled in position relative to the stationary jaw by pressurizing the circuit so as to clamp the washer against the stationary jaw and hold it between the two jaws so long as the circuit is under pressure. According to the invention, the jaws present facing complementary shapes that correspond over a large portion of the height of each tooth to the profile of each tooth and to the position that each tooth is to occupy in order to offer maximum resistance to the extraction force to which the tubular element is subjected.

A large portion of the washer is thus embedded so that its teeth become non-deformable claws that hold the tube firmly. The forces withstood by such fastening can then be large and of the same order as those that can be encountered during pressure hammering in hydraulic circuits.

In an illustrative embodiment of the invention, the movable jaw is in the form of a ring having its front face that faces the washer co-operating with a complementary face of the stationary jaw to impose a radial working profile on the washer in register with each tooth that corresponds to the maximum strength of that tooth against a force tending to extract the tube. In other words, a washer has an outer ring that, at rest, occupies a radial plane from which regularly-distributed teeth project inwards, which teeth are carried by a surface that is substantially conical. When the element for connecting passes through, the teeth splay apart and their free ends rest against the outside surface of the element, ready to penetrate therein if the material of the element (tube) makes that possible, or to drop into a groove formed in the outside surface of said element (endpiece). As a result, withdrawing the element for connection becomes impossible because it is prevented by the teeth of the washer jamming between the body of the coupling and the element. It can be understood that if the teeth are "embedded" in the body of the coupling, over a large fraction of their length, then their ability to deform elastically under the effect of the tube or the endpiece being pulled out is practically eliminated so the retaining force is large. This embedding is particularly effective when both jaws are a good fit against the teeth of the washer when arranged in their maximum-resistance position.

In an illustrative method of implementing the invention, washers are used in which each tooth is a non-deformable blade, thereby enabling it to be of length that is shorter than the length of a flexible tooth. The jaws are of a complementary shape corresponding to the non-deformable profile of each tooth at an angle of inclination (position) relative to the tube that corresponds to maximizing the effectiveness of the washer against an extraction force applied to the tube or the endpiece. With such washers, deformation is concentrated in the ring connecting together the roots of the teeth, while the non-deformable teeth tend to pivot rearwards under the effect of an extraction force, thereby reaching an optimum position for retaining the connected element, which position is set by the shape of the clamping jaws.

With such washers having non-deformable teeth, the jaws define a peripheral annular housing that, when clamped together, contains the deformable portions of the washer, without stressing them. In other words, the jaws are provided with an outer annular recess such that the deformable ring connecting together the roots of the teeth is not concerned by the clamping.

In known manner, the device includes an O-ring that is situated behind the movable jaw in the insertion direction of the tubular elements, between the tube and the setback. This O-ring is housed with axial clearance in the setback and constitutes a pusher for pushing the movable jaw towards the stationary jaw.

In an illustrative manner, the setback includes two axial sections of different diameters, the first section containing the movable jaw being the smaller-diameter section, and being connected to the other (second) section via a conical transition zone. The advantage of this arrangement lies in the elastic deformation of the O-ring under the effect of pressure so as to cause the O-ring to pass in part from the second section to the first section, thus making it possible, in the absence of pressure, for it to return spontaneously into the larger-diameter portion and relieve the movable jaw of any force that would oppose it being shifted away from the stationary jaw, thereby enabling a disconnection pusher to act freely. The stationary jaw may include an inner ring in the form of a pusher for radially lifting the teeth in order to enable the tube to be disconnected.

Finally, the rear face of the movable jaw has two sets of lips that are radially deformable under pressure from the O-ring.

Other characteristics and advantages of the invention appear from the description given below of an embodiment of the invention.

The present invention, accordingly, comprises the construction, combination of elements, and/or arrangement of parts and steps which are exemplified in the detailed disclosure to follow.

BRIEF DESCRIPTION OF THE DRAWINGS

Reference is made to the accompanying drawings, in which:

FIG. 4 shows a device of the invention in operation on a flexible or semi-rigid tube; and FIG. 5 shows the device of the invention co-operating with a rigid tube (endpiece) having an outer groove.

Figure 1:
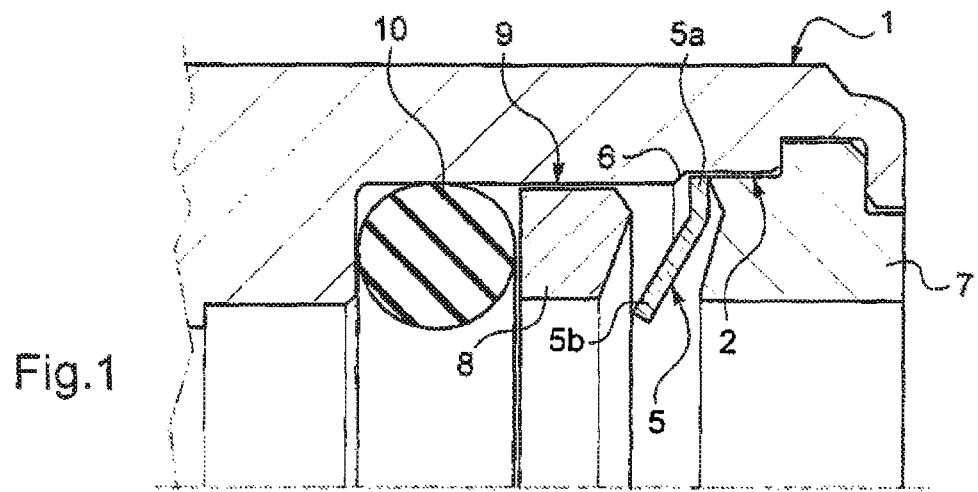
FIG. 1 is a half-view in axial section showing a first variant embodiment of the invention.

The drawings will be described further in connection with the following Detailed Description of the Invention.

DETAILED DESCRIPTION OF THE INVENTION

In these figures, identical elements of the devices are given the same references.

The coupling device shown comprises a body 1 provided with a bore 2 for receiving the end of a tubular element 3 (FIG. 4) or 4 (FIG. 5). Retention of the tubular element 3 or 4 in the bore may be effected by an elastically-deformable, grab-ring type washer 5 having an outer ring 5a peripherally interconnecting teeth 5b that extend along a surface that is substantially frustoconical, with the inside circumference thereof being of a diameter that is less than the diameter of the tubular element 3 or 4, the outer portion 5a of the washer being arranged in said bore between a shoulder 6 thereof and a retaining bushing 7 fitted to the body at the inlet to the bore 2.

The retaining bushing 7 constitutes a stationary jaw against which the convex face of the washer 5 bears. A movable jaw 8 is housed in a setback 9 of the bore 2, situated beyond the shoulder 6 relative to the stationary jaw 7. This movable jaw 8 may be caused to move towards the stationary jaw 7 by pressurizing the circuit. The washer is thus clamped between the stationary jaw 7 and the movable jaw 8 over a large fraction of the height of each tooth 5b in an optimum working position (see FIGS. 4 and 5). It is held embedded between these two jaws so long as the circuit is under pressure.

Behind the movable jaw 8 that is in the form of an annular ring, where "behind" is in the direction in which the tubular element 3 and 4 is inserted, the device includes an O-ring seal 10 that provides sealing between the setback 9 and the tubular element 3 or 4. When pressure becomes established in the coupling, after the element 3, 4 for coupling has been inserted, the seal 10 is subjected to the pressure P and it acts as an annular piston that is pushed towards the ring 8 and that entrains it towards the ring 7. The washer 5 is then tightly clamped between the stationary and movable jaws 7 and 8. This clamping imparts to the washer the same rigidity that it would have if it were actually embedded in the body 1 of the coupling, thereby significantly increasing its power of retaining the element 3, 4 against a force tending to extract it from the body 1.

The washer 5 is a washer of the kind that possesses teeth 5b in the form of non-deformable blades, whereas the ring 5a that connects them together is elastically deformable and therefore allows the blades to pivot. An example of a washer of this type is described in document EP 0 616 161. The active portion of the washer is such that the outer periphery 5a of the washer 5 is not concerned by the clamping so as to preserve its ability to avoid spoiling its characteristics as a result of the clamping forces. For this purpose, as may be seen with momentary reference to FIGS. 4 and 5, the jaws may be provided with respective annular recesses 7a and 8a that together constitute the above-mentioned housing.

In FIG. 1, it can be seen that the retaining bushing 7 is permanently mounted in the body 1, such that the coupling cannot be uncoupled without being destroyed.

Figure 2:
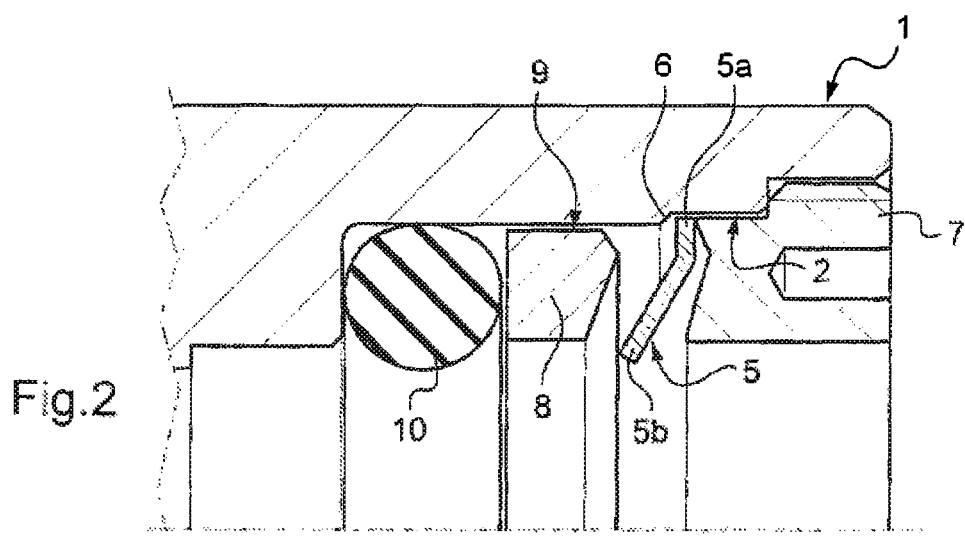
FIG. 2 is a half-view in axial section showing a second variant embodiment of the invention.

In FIG. 2, the bushing 7 is screwed into the body 1 of the coupling and the coupling can therefore be uncoupled if the bushing 7 is withdrawn.

Figure 3:
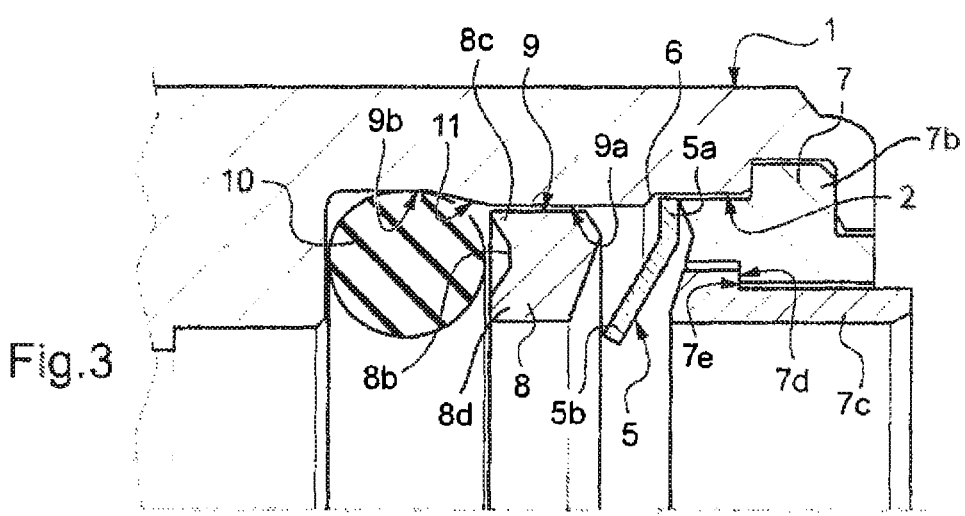
FIG. 3 is a half-view in axial section showing a third variant embodiment of the invention.

In FIG. 3, the bushing 7 is made up of two portions, a portion 7b that is fastened inside the body 1, and an inner ring 7c that is axially movable relative to the stationary, fastened portion 7b and that forms a pusher for lifting the teeth 5b of the ring 5. During clamping, this pusher comes into abutment via a rear shoulder 7d against a corresponding shoulder 7e of the stationary portion 7b so as to co-operate fully in clamping the washer.

It can also be seen in this FIG. 3 that the rear face 8b of the jaw 8 is hollowed out so as to form an outer lip 8c and an inner lip 8d that, under pressure from the O-ring seal 10, are capable of flaring apart and of bearing respectively against the wall of the setback 9 and against the tubular element 3 (FIG. 4) or 4 (FIG. 5) so as to close the clearance that exists by construction between the movable jaw 8 and those two elements, thereby preventing the seal 10 from being extruded through said clearance under the effect of the pressure of the fluid.

Still with reference to FIG. 3, it can be seen that the setback 9 is subdivided into two sections 9a and 9b that are axially in succession, the smaller-diameter section 9a containing the jaw 8, while the larger-diameter section 9b contains the seal 10, when there is no pressure in the circuit.

These two sections are connected together by a conical transition zone 11 that constitutes a "funnel" for deforming the seal 10 when it passes, at least in part, under the effect of the pressure, from the section 9b to the section 9a. This partial elastic deformation of the seal 10 gives it the ability to recover its free shape when the pressure ceases, and thus to move spontaneously out from the section 9a of the setback. This leaves space for the jaw 9 which can move rearwards without impeding the action of the pusher 7c during disconnection of the device.

FIGS. 4 and 5 show the behavior of the seal 10 in service. FIG. 4 shows the teeth 5 penetrating into a tube end 3 that is made of a material into which the teeth can bite, whereas FIG. 5 shows the connection of an endpiece 4 that includes an outer groove 4a in which the ends of the teeth 5 are received elastically after being raised during insertion of the endpiece.

These two figures also show the complementary shapes of the active faces of the jaws 7 and 8 that retain the teeth at an optimum angle of inclination for the function of retaining the tube or the endpiece in the bore of the body 1.

In certain configurations (not shown), a plurality of washers 5 are implemented one behind another to increase the anti-extraction power of the coupling.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connection to an end of a tubular element for receiving a source of fluid pressure, the coupling comprising:
    a generally tubular body having a bore therethrough extending into the body from an open end thereof towards an internal shoulder, the bore having a counterbored portion extending from the open end of the body to an internal end wall, and the shoulder being defined in the counterbored portion between the end wall and the body open end;
    a slidably movable jaw ring received coaxially in the bore counterbored portion between the end wall and the shoulder, the jaw ring having a forward surface facing the shoulder and defining a movable jaw face;
    a generally annular bushing fitted coaxially into the body open end, the bushing having a rearward surface facing the movable jaw face and defining a stationary jaw face positioned between the shoulder and the body open end;
    a resiliently expandable grab ring received coaxially in the bore counterbored portion, the grab ring having an outer diameter portion disposed between the shoulder and the stationary jaw face, and an inner diameter portion divided into a plurality of teeth, each of the teeth having a height extending from the outer diameter portion to the inner diameter portion, and the tubular element end being receivable coaxially into the bore through the teeth of the grab ring; and
    a seal ring received coaxially in the bore counterbored portion between the end wall and the jaw ring,
    wherein with the tubular element end being inserted coaxially from the body open end into the bore and through the bushing and the teeth of the grab ring, and with the tubular element being grabbed by the teeth of the grab ring to retain the tubular element end in the bore, the seal ring is responsive to fluid pressure received within the tubular element to slidably move forwardly towards the stationary jaw face, such movement urging the jaw ring towards the stationary jaw face such that a portion of the height of the grab ring teeth between the grab ring outer diameter portion and inner diameter portion is clamped between the movable jaw face and the stationary jaw face restricting the removal of the tubular element end out of the bore.

2. The coupling of claim 1 wherein the movable jaw face has a first shape and the stationary jaw face has a second shape, the first and the second shape being complementary.

3. The coupling of claim 1 wherein the bore counterbored portion comprises a first section adjacent the end wall having a first diameter, and a second section adjacent the shoulder having a second diameter smaller than the first diameter,
    whereby the seal ring is compressed radially between the tubular element and the second section as the seal ring moves in the bore from the first section to the second section.

4. The coupling of claim 3 wherein the bore counterbored portion further comprises a generally conical transition zone connecting the first section to the second section.

5. The coupling of claim 1 wherein there is a clearance between the movable jaw ring and one or both of the bore and the tubular element, and wherein the jaw ring has a rearward surface facing the seal ring configured as having a pair of radially spaced-apart lips, one or both of the lips being radially outwardly deformable by the seal ring being received therebetween to bear against a corresponding one of the bore or the tubular element.

6. The coupling of claim 1 wherein the tubular element is tube formed of a material which is penetrable by the teeth of the grab ring to retain the tube end in the bore.

7. The coupling of claim 1 wherein the tubular element is an endpiece having an outer groove, the grab ring teeth being received in the groove to retain the endpiece in the bore.

8. The coupling of claim 1 further comprising a generally annular pusher having a pusher end retained coaxially in the bushing,
    wherein with the tubular element end being inserted coaxially from the body open end into the bore through the pusher, the pusher is slidably movable rearwardly in the bore such that the pusher end engages the grab ring teeth to radially expand the grab ring inner diameter portion allowing the tube end to be removed from within the bore.

9. A fluid assembly comprising:
    a tubular element for receiving a source of fluid pressure, the element having an end;
    a coupling for connection to the end of the tubular element, the coupling comprising:
        a generally tubular body having a bore therethrough extending into the body from an open end thereof towards an internal shoulder, the bore having a counterbored portion extending from the open end of the body to an internal end wall, and the shoulder being defined in the counterbored portion between the end wall and the body open end;
        a slidably movable jaw ring received coaxially in the bore counterbored portion between the end wall and the shoulder, the jaw ring having a forward surface facing the shoulder and defining a movable jaw face;
        a generally annular bushing fitted coaxially into the body open end, the bushing having a rearward surface facing the movable jaw face and defining a stationary jaw face positioned between the shoulder and the body open end;

a resiliently expandable grab ring received coaxially in the bore counterbored portion, the grab ring having an outer diameter portion disposed between the shoulder and the stationary jaw face, and an inner diameter portion divided into a plurality of teeth, each of the teeth having a height extending from the outer diameter portion to the inner diameter portion, and the tubular element end being receivable coaxially into the bore through the teeth of the grab ring; and a slidably movable seal ring received coaxially in the bore counterbored portion between the end wall and the jaw ring, wherein with the tubular element end being inserted coaxially from the body open end into the bore and through the bushing and the teeth of the grab ring, and with the tubular element being grabbed by the teeth of the grab ring to retain the tubular element end in the bore, the seal ring is responsive to fluid pressure received within the tubular element to slidably move forwardly towards the stationary jaw face, such movement urging the jaw ring towards the stationary jaw face such that a portion of the height of the grab ring teeth between the grab ring outer diameter portion and inner diameter portion is clamped between the movable jaw face and the stationary jaw face restricting the removal of the tubular element end out of the bore.

10. The assembly of claim 9 wherein the movable jaw face has a first shape and the stationary jaw face has a second shape, the first and the second shape being complementary.

11. The assembly of claim 9 wherein the bore counterbored portion comprises a first section adjacent the end wall having a first diameter, and a second section adjacent the shoulder having a second diameter smaller than the first diameter, whereby the seal ring is compressed radially between the tubular element and the second section as the seal ring moves in the bore from the first section to the second section.

12. The assembly of claim 11 wherein the bore counterbored portion further comprises a generally conical transition zone connecting the first section to the second section.

13. The assembly of claim 9 wherein there is a clearance between the movable jaw ring and one or both of the bore and the tubular element, and wherein the jaw ring has a rearward surface facing the seal ring configured as having a pair of radially spaced-apart lips, one or both of the lips being radially outwardly deformable by the seal ring being received therebetween to bear against a corresponding one of the bore or the tubular element.

14. The assembly of claim 9 wherein the tubular element is tube formed of a material which is penetrable by the teeth of the grab ring to retain the tube end in the bore.

15. The assembly of claim 9 wherein the tubular element is an endpiece having an outer groove, the grab ring teeth being received in the groove to retain the endpiece in the bore.

16. The assembly of claim 9 further comprising a generally annular pusher having a pusher end retained coaxially in the bushing, wherein with the tubular element end being inserted coaxially from the body open end into the bore through the pusher, the pusher is slidably movable rearwardly in the bore such that the pusher end engages the grab ring teeth to radially expand the grab ring inner diameter portion allowing the tube end to be removed from within the bore.

* * * * *